US010144340B2

(12) United States Patent
Cholley

(10) Patent No.: US 10,144,340 B2
(45) Date of Patent: Dec. 4, 2018

(54) MOTOR VEHICLE LIGHTING AND/OR SIGNALING DEVICE

(71) Applicant: VALEO VISION, Bobigny (FR)

(72) Inventor: Benoit Cholley, Angers (FR)

(73) Assignee: VALEO VISION, Bobigny (FR)

( * ) Notice: Subject to any disclaimer, the term of this patent is extended or adjusted under 35 U.S.C. 154(b) by 14 days.

(21) Appl. No.: 15/609,817

(22) Filed: May 31, 2017

(65) Prior Publication Data
US 2017/0341564 A1 Nov. 30, 2017

(30) Foreign Application Priority Data

May 31, 2016 (FR) ...................... 16 54917

(51) Int. Cl.
B60Q 1/12 (2006.01)
F21V 29/67 (2015.01)
B60Q 1/04 (2006.01)
B60Q 1/076 (2006.01)
F21S 41/147 (2018.01)
F21S 41/29 (2018.01)
F21S 45/49 (2018.01)
F21S 45/43 (2018.01)
F21S 41/141 (2018.01)

(52) U.S. Cl.
CPC ........... *B60Q 1/122* (2013.01); *B60Q 1/0425* (2013.01); *B60Q 1/076* (2013.01); *F21S 41/147* (2018.01); *F21S 41/29* (2018.01); *F21S 45/43* (2018.01); *F21S 45/49* (2018.01); *F21V 29/67* (2015.01); *B60Q 1/12* (2013.01); *F21S 41/141* (2018.01)

(58) Field of Classification Search
CPC ...... B60Q 1/122; B60Q 1/076; B60Q 1/0425; B60Q 1/12; F21S 45/43; F21S 45/49; F21S 41/29; F21S 41/147; F21S 41/141; F21V 29/67
See application file for complete search history.

(56) References Cited

U.S. PATENT DOCUMENTS

| 2007/0147060 A1* | 6/2007 | Chen | B60Q 1/076 362/513 |
| 2009/0034279 A1 | 2/2009 | Blandin et al. | |
| 2010/0244649 A1* | 9/2010 | Inaba | F21K 9/00 313/46 |

(Continued)

FOREIGN PATENT DOCUMENTS

EP 2 020 336 A1 2/2009
EP 2 687 406 A1 1/2014
(Continued)

OTHER PUBLICATIONS

French Preliminary Search Report dated Jan. 24, 2017 in French Application 16 54917 filed on May 31, 2016 (with English Translation of Categories of Cited Documents).

Primary Examiner — Kevin Quaterman
(74) Attorney, Agent, or Firm — Oblon, McClelland, Maier & Neustadt, L.L.P.

(57) ABSTRACT

A motor vehicle directional lighting and/or signaling device comprises a light module rotationally mobile about an axis (A-A) supported by a base bearing elements for guiding in rotation about the axis (A-A). A bearing of the rotation guiding elements is formed partly by the base and partly by a support piece of a fan.

20 Claims, 2 Drawing Sheets

(56) References Cited

U.S. PATENT DOCUMENTS

| | | | |
|---|---|---|---|
| 2011/0222303 A1* | 9/2011 | Tokida | ............... F21S 48/1154 |
| | | | 362/516 |
| 2013/0170244 A1 | 7/2013 | Thullier et al. | |
| 2014/0022806 A1 | 1/2014 | Shibata | |
| 2015/0176795 A1 | 6/2015 | Kikuchi et al. | |
| 2015/0292705 A1 | 10/2015 | Thullier et al. | |

FOREIGN PATENT DOCUMENTS

| | | |
|---|---|---|
| FR | 2 952 870 A1 | 5/2011 |
| FR | 2 965 039 A1 | 3/2012 |

\* cited by examiner

MOTOR VEHICLE LIGHTING AND/OR SIGNALING DEVICE

The present invention relates to a motor vehicle lighting and/or signaling device, and more particularly a rotary light module, capable of pivoting according to the trajectory followed by the vehicle, with which such a device is equipped.

A motor vehicle is equipped with headlights for forming lighting and/or signaling devices intended to illuminate the road in front of the vehicle, at night or in case of reduced brightness, by a global light beam. These headlights, a left headlight and a right headlight, comprise one or more light modules suitable for generating and directing an intermediate light beam, the addition of which forms said global light beam.

The players in the motor vehicle market have developed, notably for the visual comfort of the driver and driving safety, a plurality of complementary lighting functions, among which the directional lighting function, better known by the acronym DBL (for Dynamic Bending Light), can notably be identified. The aim of such a function is to dynamically light the bends when the vehicle is turning. To this end, it is known practice to mount the pivoting light module about a substantially vertical axis of rotation, such that, in a bend, the beam projected at the output of the headlight is no longer oriented in the longitudinal axis of the vehicle but toward the inside of the bend.

The field of the invention is, generally, that of the headlights for motor vehicles that fulfil the directional lighting function. In this context, the document FR2965039 discloses a light module capable of being mounted to rotate in a casing of a lighting device via a fixed base. The base comprises, on the one hand, motorized means for driving the module in rotation and, on the other hand, at least one bearing for guiding the module in rotation, opposite the motorized means relative to the module, in order to ensure the rotation thereof about the driving axis. The rotation guiding bearing notably consists of a half shell added against the base to grip a pin of corresponding form and dimensions mounted on the module, and more particularly on an enclosure of the module that otherwise allows the positioning and the fixing of a light source and of an associated optical projection system, as well as the positioning and the fixing of cooling members, including a heat sink and a fan. The enclosure of the module is configured to cooperate with the rotation driving and guiding elements home by the base, and the rotation of this enclosure generates the rotation of each of the parts that make up the module. It will be understood that the significant number of parts added to the enclosure increases the weight of the module, which can be detrimental to the rotating thereof for a directional lighting, and which may require an overdimensioning of the rotational driving elements of the module.

To remedy the abovementioned drawbacks of the prior art, the invention proposes a motor vehicle directional lighting and/or signaling device composing a light module rotationally mobile about an axis, that is to say capable of producing at least one orientable light beam. The axis of rotation is supported by a base bearing elements for guiding the module in rotation about the axis. According to the invention, a bearing of the rotation guiding elements is formed partly by the base and partly by a support piece of a fan.

The module can thus be mounted to rotate the lighting and/or signaling device of a motor vehicle so as to orient the optical axis of the module according to bends negotiated by the vehicle. The rotation of the light module relative to the device is ensured by the base, notably fixed relative to a casing of the device. The geometry of the base can be defined such that it can surround the light module.

The light module cooperates with the base via rotational guiding elements and driving elements, which can also be added to the base implementing this rotation. The rotation guiding elements and the driving elements can be coaxial according to an axis, notably vertical, defining the axis of rotation of the module. The rotation guiding elements and the driving elements can respectively define an upper guiding bearing and a lower guiding bearing, which are opposite and aligned according to the axis of rotation of the light module.

The light module can, for example, be fitted to the driving elements via an orifice and cooperate with the rotation guiding elements via a pivot link.

According to other features of the invention, taken alone or in combination, it will be possible to provide for:
- the guiding bearing to be formed by a portion of circular profile arranged on a wall of the base and by a portion of circular profile arranged on a wall of the support piece arranged facing the base;
- the guiding bearing to be formed by two portions of equivalent profiles, arranged in mirror configuration;
- the support piece to be fixed to the base by fixing members arranged on either side of the guiding bearing; these fixing members will notably be able to comprise tightening screws, and it will be possible to provide for indexing means to be associated with these fixing members to make it possible to ensure the position of the fixing members and therefore the correct position of two parts forming the guiding bearing;
- the base and the support piece to be formed in one and the same material; the material used will notably be able to be a thermoplastic polymer, and for example polybutylene terephthalate (PBT), advantageously filled with glass fibers;
- the support piece to have an open part for receiving an end of the fan;
- the open part of the support piece to be formed opposite the part forming the guiding bearing;
- the support piece to have at least fixing elements for the fan;
- the fixing elements for the fan to comprise at least one pair of retaining lugs extending opposite the part of the support piece forming the guiding bearing;
- fixing elements for the fan to be arranged laterally in the support piece whereas a positioning member is arranged in a central position relative to the support piece;
- the light module to comprise at least light ray emission devices and cooling members;
- the fan to be able to be like a parallelepiped of which two of the opposing faces, called top face and bottom face, have a square bottom, and the fan to be housed in the support, piece in a position such that the diagonal of a square is substantially parallel to the optical axis of the light rays emitted;
- the fan to be situated directly above at least a part of the cooling members, relative to the direction of the axis of rotation; in particular, the cooling members can comprise fins arranged protruding from the module so as to optimize the heat exchange surface between the latter and the ambient air, and the fan is borne by the support piece so as to be located directly above at least a part of these fins.

a lens forming part of the light ray emission devices to be positioned and fixed in front of the base, while the cooling members, the support piece and the fan are positioned mid fixed behind this base.

the device to comprise a casing defining, with a closing outer lens, a housing for at least one rotationally mobile light module;

the base to be fixed to the casing;

a plurality of rotary light modules can be arranged in the housing defined by the casing and the closing outer lens, the latter being common to each of the modules.

Other features and advantages of the invention will become more clearly apparent on reading the detailed description of an embodiment of the invention, given as an illustrative and nonlimiting example and supported by the figures in which.

Figure 1:
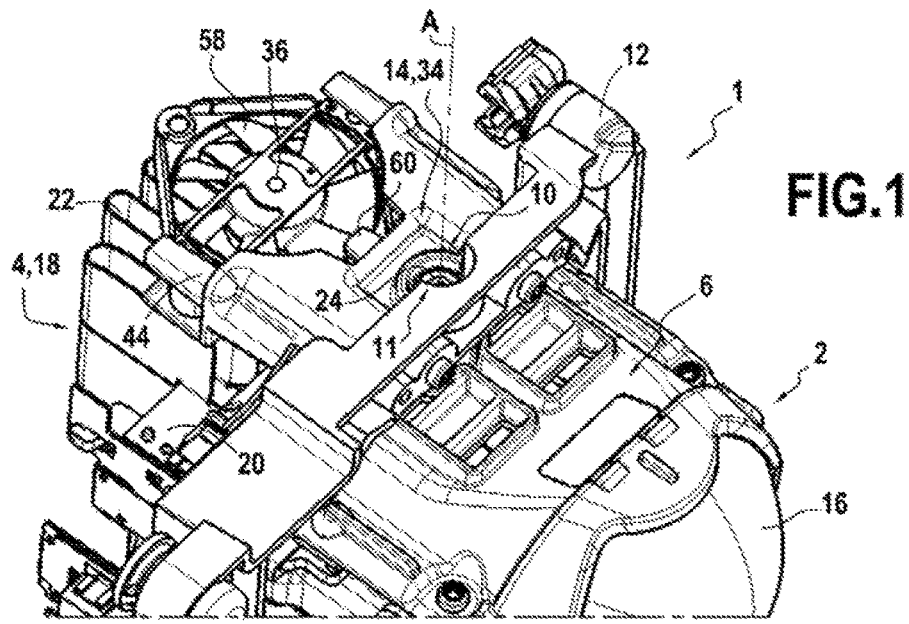
FIG. 1 is a partial view, in front three-quarters perspective, of a lighting module according to the invention.

Hereinbelow, the terms "front" and "rear" will be understood in relation to the main direction of emission of rays at the output of the light module, along the optical axis of the module, and in the direction of emission of these rays from rear to front.

Also, the references relating to a "top/bottom" positioning of the components and/or of the structural elements of a component will be understood in relation to a position of operation of the module in the vehicle.

A lighting and/or signaling device 1 configured according to the invention to participate in a directional lighting function comprises at least one light module 2 as will be described by way of example hereinbelow. This at least one light module can notably be housed, alone or in the vicinity of other light modules, in a casing of the device closed by a closing outer lens.

A light module 2 comprises light ray emission devices, cooling members 4 and a case 6 configured to support all of these elements. The module is rotary in that the case cooperates with driving elements 8 provided to rotate the case and in particular the emission devices about an axis of rotation A-A, the rotation being facilitated by at least rotation guiding elements 10. Advantageously, a guiding bearing 11 of these rotation guiding elements 10 is formed by the cooperation of a part of a base 12 with an additional piece 14 added against this part of the base.

The light module 2 is mounted to pivot about the axis of rotation A-A relative to the base 12, elsewhere fixed to the casing, between two extreme angular positions, defined by the footprint of the deuce and the abutment of the mod isle against the walls of the base and which allow, according to the trajectory of the vehicle, a right/left orientation of the light beam produced by the lighting and/or signaling device.

The light ray emission devices comprise at least one light source (not visible) and a ray-forming optical system, here comprising a reflector (not visible) and a lens 16.

The cooling members 4 notably comprise a heat exchanger or heat sink 18, which has a support plate 20, on which is arranged the at least one light source, prolonged to the rear of the module by a succession of cooling fins 22.

It will be understood that the heat given off by the light source, and notably by the associated printed circuit board when the light source is a light-emitting diode, is evacuated from the module via the support plate and cooling fins.

The case 6 is configured to at least partially cover each of the emission devices and cooling members of the module, and to ensure their correct positioning relative to one another. In the example illustrated, the case is formed by two, lower 6a and upper 6b shells arranged facing one another and fixed, but it will be understood that the number of light sources and of reflectors, here one of each for each shell, will be able to vary such that only a single shell is necessary to form the case.

Each shell extends longitudinally, that is to say in the direction of the optical axis of the module, from the heat sink 18 to the lens 16.

The upper shell 6b comprises a pin 24 arranged protruding from its top face to cooperate with the base 12 and form elements for guiding the module in rotation, whereas the lower shell comprises a bore hollowed out from its bottom face whose section forms an impression complementing a male element 26 of the driving elements 8 borne by the base.

The module is, in the embodiment, illustrated surrounded by the base 12 which forms a frame. The base is fixed, here secured to the casing of the lighting and/or signaling device. The base-forming frame, notably visible in FIG. 3, comprises two vertical uprights 28 which extend parallel or substantially parallel and which bear fixing means, some of which can be adjustable, for fixing the base to the casing of the lighting and/or signaling device, here not represented, and it comprises an upper bar 30 and a lower bar 32 linking together the top and bottom ends of the vertical uprights.

The lower bar 32 is, in the case illustrated, secured to the driving elements 8 and the associated male element 26, it being understood that a bottom rotation guiding bearing (here not present) could be formed at the level of this lower bar.

Opposite the driving elements, that is to say on the other side of the module when the latter is surrounded by the base-forming frame, a rotation guiding bearing 11 is provided, formed partly by the upper bar 30 of the base 12 and partly by the additional piece 14 consisting of a support piece 34 of a fan 36.

More particularly, the upper bar comprises, substantially at its center, a first notch 37 which forms a first part of the guiding bearing 11. This first notch has a profile, in a cutting plane at right angles to the axis of rotation A-A, which takes the form of a half-circle of a size defined to fit the diameter of the pin made to cooperate with the guiding bearing 11 that this first notch helps to form.

In the embodiment illustrated, the driving elements 8 act as bottom rotation guiding elements. These driving elements 8 and the rotation guiding elements 10 produced on the opposite upright, here upper, of the frame are arranged coaxially or substantially coaxially according to an axis A-A of rotation of the module. A top bearing and a bottom bearing are thus defined, which are opposite and aligned according to the axis A-A, here vertical.

As was able to be specified before, the module has, on its case 6, members respectively complementing the driving elements and guiding bearings of the rotation guiding elements, and notably through the presence of a pin 24 dimensioned to be housed in the guiding bearing 11, possibly associated with position stop means for preventing the separation of the pin from the bearing. It will be possible to provide a rolling bearing to facilitate the rotation of the pin in the bearing and therefore the rotation of the module about the axis of rotation A-A, without the presence of this rolling bearing being essential to the correct operation of the invention. At the opposite end, at the level of the lower bar of the base, and as a nonlimiting example, the case will be able to be fitted onto the male element 26 of the driving elements 8 via an orifice situated on its bottom face and having a form, for example of star section, complementing the male element.

Figure 4:
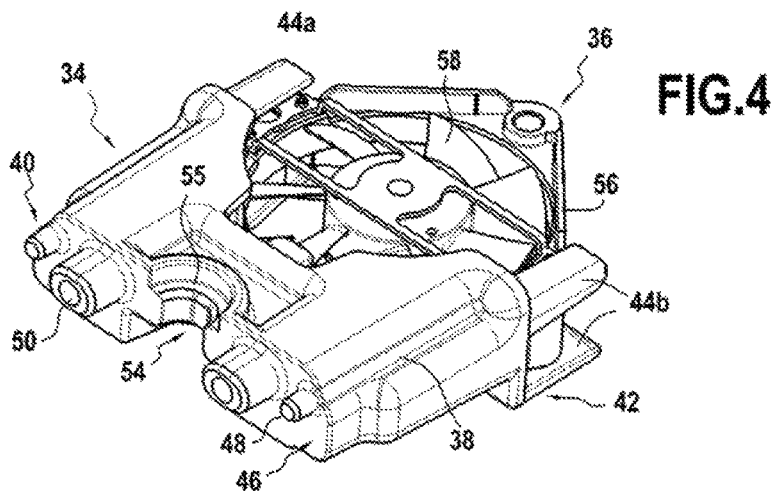
FIG. 4 is an assembled view of the fan support and of the fan that it supports.
Figure 3:
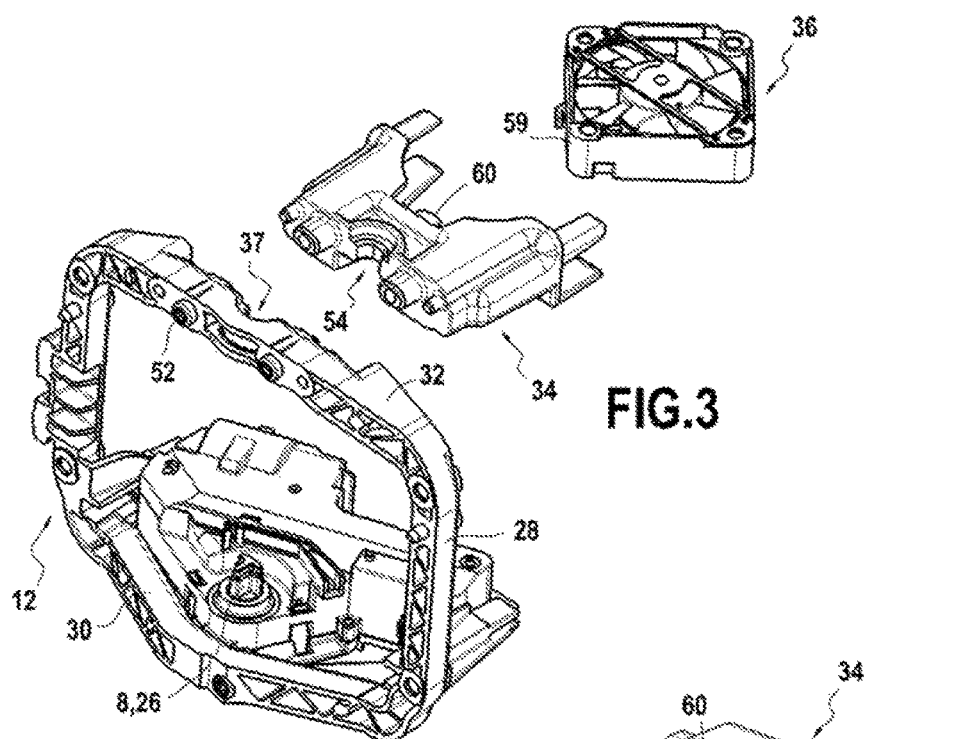
FIG. 3 is an exploded perspective view of a base serving as rotation support for the lighting module of FIG. 1, of a support piece of a fan forming, with the base, a bearing for guiding the module in rotation.
Figure 5:
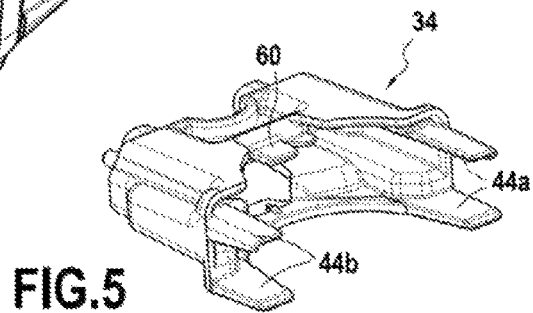
FIG. 5 is a three-quarters rear perspective view of the fan support of FIG. 3.

There now follows a more detailed description of the upper rotation guiding elements, that is to say the elements arranged opposite the driving elements relative to the module, referring in particular to FIGS. 3 to 5.

The support piece 34 is configured to, on the one hand, delimit a bore forming a rotation guiding bearing 11 when it is docked against the base 12, and to, on the other hand, at least partially receive the fan 36, so as to support it in a determined operating position. It will be understood that "supporting" the fan means the action of taking up the loads exerted on the component and transmitting them to the structure of the motor vehicle. Consequently, it is the casing of the headlight and not of the case of the module which is affected by the weight, notably of the fan, and the rotation movements of the module can be taster and more reliable.

Figure 2:
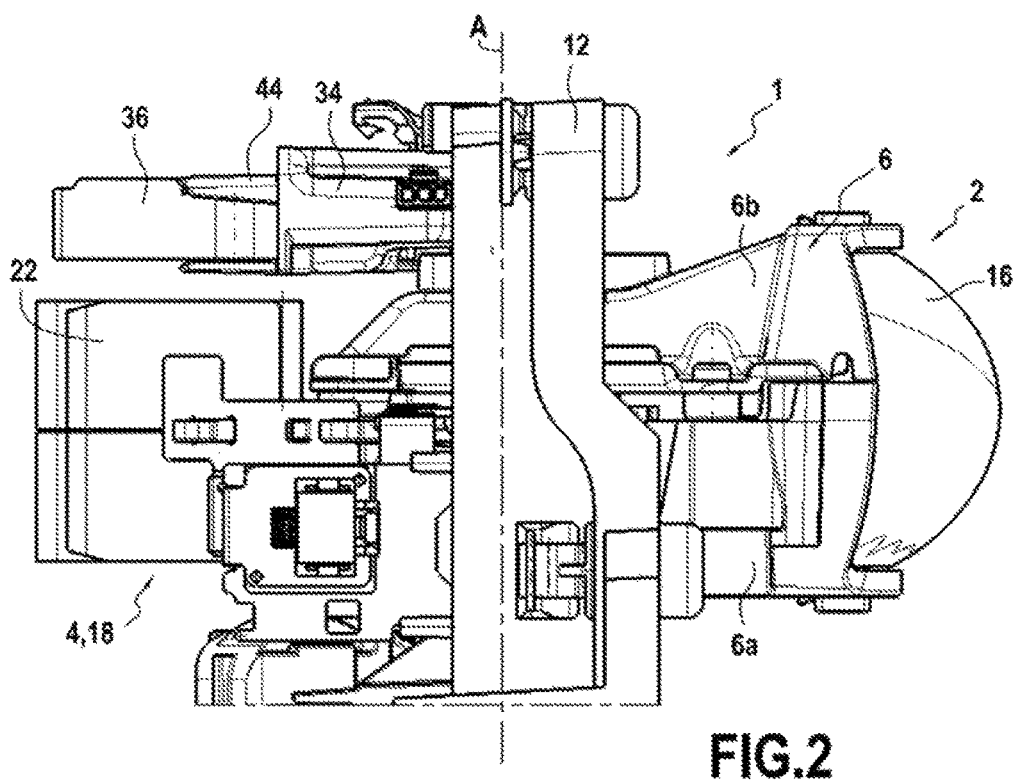
FIG. 2 is a side view of the lighting module of FIG. 1.

FIGS. 1 and 2 were able to illustrate a desired position of operation of the fan directly above the fins 22 of the cooling members 4. In this position, the fan 36 participates in the circulation of air between the fins 22 and in the effective cooling of the module.

The support piece 34 comprises a body 38, prolonged at a first end 40 by a plurality of pins and drums and prolonged at an opposite second end 42 by retaining lugs 44 that are parallel or substantially parallel to one another.

At the first end 40, a transverse end wall 46 bears, in the example illustrated, two pins 48 and two drums 50 which extend away from the body 38 of the support piece and which are configured to cooperate with corresponding female elements arranged on the upper bar 32 of the base. It will be understood that the pins 48 allow a position indexing of the support piece when it is brought against the upper bar of the base and that the drums allow the fixing of the support piece on the base via fixing screws or pins 52 passing through these drums, thus forming fixing members.

The pins and the drums are arranged on the transverse end wall 46 one either side of a second notch 54 which forms a second part of the guiding bearing complementing the first pan of the guiding bearing formed by the first notch. Mirroring what was able to be described previously for the first notch 37 of the upper bar 32 of the base 12, the second notch 54 has a profile, in a cutting plane at right angles to the axis of rotation A-A, which takes the form of a half-circle of a dimension defined to suit the diameter of the pin made to cooperate with the guiding bearing 11 that this second notch helps to form. It will be understood from the above that the first 37 and second 54 notches have symmetrical profiles, the assembly of which allows the formation of a rotation guiding bearing of circular section. Without departing from the context of the invention, it would be possible to provide for the notches forming the bearing to have different profiles and for one of the notches to be deeper than the other notch and make up a little more than half of the bearing, provided that, when the support piece is fixed against the base, the outer face of the transverse end wall being pressed against the base, the bringing together of the two notches form a guiding bearing with circular outline.

Moreover, it should be noted that the second notch 54 has a shoulder 55 in the extension of the top edge of the notch. It will be understood that this shoulder can make it possible to house means for stopping a pin 24 in position inside the guiding bearing 11. The first notch 37 will advantageously comprise a symmetrical shoulder (here not visible in FIG. 3).

In order to facilitate the fixing of the two parts forming the bearing 11 of the rotation guiding elements 10, namely the base 12 and the support piece 34, it will be possible to provide for these two parts to be produced in one and the same material and for example a thermoplastic polymer of polybutylene terephthalate (PBT) type, advantageously filled with glass fibers.

The inner face of this transverse end wall 46 forms the bottom wall of a cavity defined by the body 38 hollowed out from the opposite end between the retaining lugs 44. This cavity makes it possible, on the one hand, to reduce the weight of the part, and it allows the at least partial insertion of the fan into the support piece for its correct positioning before fixing.

The retaining lugs 44 are configured to cooperate by engagement with attachment parts of the fan 30. Additional fixing means, here not represented, can be provided to fix the position of the fan between the retaining lugs. More particularly, two first retaining lugs 44a arranged laterally on the same side of the body 38 together form a fan retaining element the separation of these first retaining lugs being such that the fan, in its thickness, can come to be housed between these two first lugs. Two second retaining lugs 44b form, laterally opposite, a similar retaining element.

The retaining lugs 44 extend horizontally to the rear of the support piece 34, such that the fan 36 is situated directly above the cooling fins 22, according to the direction of the axis of rotation A-A of the module.

The fan 36 comprises a casing 56 inside which rotary blades 58 are arranged. The casing has a parallelepipedal form with a top face 36a and an opposite bottom face 36b linked to one another by lateral walls 36c. The top and bottom faces, with square base, are separated to allow passage for the flow of air disturbed by the rotation of the blades. At each corner of the casing through-bores are provided to allow the fixing of the fan.

In the assembled position of the fan 36 and the support piece 34, notably visible in FIG. 4, the fan is oriented such that one of the diagonals of the square is aligned with or parallel to the optical axis. Thus, a first vertex of the fan points toward the support piece, a first corner 59 being substantially centered relative to the body 38, and this body has a positioning finger 60 extending directly above the first corner 59 of the corresponding casing. The positioning finger participates in the securing of the fan relative to the support piece, by making it possible to avoid the tilting of the fan. This arrangement of the fan corresponds to a fixing on the support piece with two lateral positioning and fixing zones at the level of the retaining lugs and a central, at least positioning, zone.

As has just been described, it can be seen that, in the assembled position of the fan and of the support piece, the active surface of the fan, that is to say the surface not covered by the support piece, is as large as possible.

FIG. 2 shows a "staircase" arrangement of the upper bar 32 of the fixed base 12 of the support piece 34 and of the fan 36 which are aligned, on three parallel planes arranged such that each component is positioned at a level slightly lower than that of the preceding component. In particular, the fan is not centered on the height of the support piece. This way, the fan is brought closer to the cooling fins to optimize the cooling function.

In the lighting module according to the invention, it can be seen that the thermal cooling members follow the rotational movement of the module since the support plate of the light source, bearing the cooling fins, is secured in rotation, to the case 6. Also, at the same time, during the pivoting movement of the module, the fan 36 for its part remains fixed since it is secured to the base 12 fixed to the casing of the lighting and/or signaling device. It is notable that the relative movement of the fan relative to the cooling fins participates in the disturbance of the air flow made to pass between the fins, which causes the efficiency of the heat exchange with the heat sink to be improved.

The above description aims to explain how the invention makes it possible to achieve the objectives set for it and in particular propose a lighting and/or signaling device which allows the production of a directional lighting beam, with at least one light module for which the structure of a piece has been, modified to give it a dual function. The result thereof is a two-fold advantage, in a context of reduction of the number of parts to be provided to produce lighting and/or signaling devices, consisting on the one hand in the securing of the fan by fixed elements relative to the casing of the device and distinct from the rotating module and, on the other hand, in the simplification of the case of the module which no longer has to act as support for the fan. The form of certain parts described above, and for example that of the support piece and/or that of the fan, could be modified since the support piece allows both the production of a guiding bearing with the base and the positioning and the fixing of a heat sink, at a distance from the body of the rotary module. It will also be possible to envisage, without departing from the context of the invention, the base not being in the form of a frame, but for example in the form of two mutually independent upper and lower bars bearing, as previously, driving elements and rotation guiding elements.

The invention claimed is:

1. Motor vehicle directional lighting and/or signaling device comprising at least:
   one light module rotationally mobile about an axis (A-A);
   elements for guiding this light module in rotation about the axis (A-A);
   a base bearing at least some of the rotation guiding elements;
   a fan;
wherein a bearing of the rotation guiding elements is formed partly by the base and partly by a support piece of the fan.

2. Directional lighting and/or signaling device according to claim 1, wherein the guiding bearing is formed by a portion of circular profile arranged on a wall of the base and by a portion of circular profile arranged on a wall of the support piece arranged facing the base.

3. Directional lighting and/or signaling device according to claim 2, wherein the guiding bearing is formed by two portions of equivalent profiles, arranged in mirror configuration.

4. Directional lighting and/or signaling device according to claim 1, wherein the support piece is fixed to the base by fixing members arranged on either side of the guiding bearing.

5. Directional lighting and/or signaling device according to claim 1, wherein the base and the support piece are formed in one and the same material.

6. Directional lighting and/or signaling device according to claim 1, wherein the support piece has an open part for receiving an end of the fan.

7. Directional lighting and/or signaling device according to claim 6, wherein the open part of the support piece is formed opposite the part forming the guiding bearing.

8. Directional lighting and/or signaling device according to claim 1, wherein the support piece has at least fixing elements for the fan.

9. Directional lighting and/or signaling device according to claim 8, wherein the fixing elements for the fan comprise at least one pair of retaining lugs extending opposite the part of the support piece forming the guiding bearing.

10. Directional lighting and/or signaling device according to claim 9, wherein fixing elements for the fan are arranged laterally in the support piece whereas a positioning member is arranged in a central position relative to the support piece.

11. Directional lighting and/or signaling device according to claim 1, wherein the light module comprises at least light ray emitting devices and cooling members.

12. Directional lighting and/or signaling device according to claim 11, wherein the fan is situated directly above at least a part of the cooling members, relative to the direction of the axis of rotation (A-A).

13. Directional lighting and/or signaling device according to claim 1, wherein the device comprises a casing defining, with a closing outer lens, a housing for at least one rotationally mobile light module.

14. Directional lighting and/or signaling device according to claim 13, wherein the base is fixed to the casing.

15. Directional lighting and/or signaling device according to claim 3, wherein the support piece is fixed to the base by fixing members arranged on either side of the guiding bearing.

16. Directional lighting and/or signaling device according to claim 4, wherein the base and the support piece are formed in one and the same material.

17. Directional lighting and/or signaling device according to claim 5, wherein the support piece has an open part for receiving an end of the fan.

18. Directional lighting and/or signaling device according to claim 17, wherein the open part of the support piece is formed opposite the part forming the guiding bearing.

19. Directional lighting and/or signaling device according to claim 7, wherein the support piece has at least fixing elements for the fan.

20. Directional lighting and/or signaling device according to claim 19, wherein the fixing elements for the fan comprise at least one pair of retaining lugs extending opposite the part of the support piece forming the guiding bearing.

* * * * *